3,301,907
METHOD FOR PREPARATION OF REACTION PRODUCTS OF DECABORANE AND CONJUGATED DIOLEFINS
Eugene J. De Lorenzo, Bronx, N.Y., and Robert V. Wright, North Highland, Calif., assignors, by mesne assignments, to the United States of America as represented by the Secretary of the Air Force
No Drawing. Filed Apr. 20, 1961, Ser. No. 104,472
13 Claims. (Cl. 260—606.5)

This invention relates to the preparation of solid and liquid reaction products of decaborane and a conjugated diolefin.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this application can be employed as fuels according to the method described in application Serial No. 497,407, filed March 28, 1955, now U.S. Patent No. 2,999,117, by Elmer R. Altwicker, Alfred B. Garrett, Samuel W. Harris and Earl A. Weilmuenster.

In accordance with this invention, decaborane is reacted with a conjugated diolefin hydrocarbon having from four to five carbon atoms in the presence of a catalytic amount of lower dialkyl ether.

Suitable conjugated diolefin hydrocarbons include 1,3-butadiene, 2-methyl-1,3-butadiene (isoprene) and the like. Suitable lower dialkyl ethers include dimethyl ether, diethyl ether, di-n-propyl ether, diisopropyl ether, methyl ethyl ether, ethyl-n-propyl ether and the like.

The ratio of reactants can be varied widely, generally being in the range of 0.1 to 10 moles of decaborane per mole of the conjugated diolefin and preferably in the range of 0.5 to 2 moles of decaborane per mole of conjugated diolefin. The ratio of lower dialkyl ether employed can also be varied widely, generally being in the range of 0.1 to 10 moles of lower dialkyl ether per mole of decaborane and preferably in the range of 0.5 to 3 moles of lower dialkyl ether per mole of decaborane. The reaction temperature can vary widely, generally from 100° C. to 200° C. and preferably between 120° C. and 180° C. The reaction generally requires about 1 to 8 hours depending upon the particular reactants employed, the ratio of the reactants and the temperature and pressure employed. The reaction pressure also can vary widely from one to several atmospheres. It is convenient, however, to carry out the reaction in a closed vessel at autogenous pressures.

The following examples illustrate the process of the invention. In all of the examples a 150 cc. high-pressure cylinder was employed as the reactor and contained a thermocouple for measuring inside temperature, a 930 p.s.i.g. rupture disk assembly, a 0 to 1000 p.s.i.g. pressure gauge and a needle valve. Heat and agitation were supplied by rocking the reactor in an electrically heated oil bath.

In each example the solid and liquid ingredients were introduced into the reactor, the reactor was cooled to −196° C. in a liquid nitrogen bath and the gaseous components were then condensed into the reactor which was then sealed. An oil bath was placed around the reactor and heated slowly while the reaction took place. The reactor was cooled to room temperature and the volatile materials were collected and sampled. The reactor was then disassembled in a nitrogen atmosphere and the reaction products were removed. Separation of the various products was carried out by filtration, distillation, or trituration.

*Example 1*

In Example 1 the reactants were heated slowly from −196° C. to +165° C. and during this time the pressure gradually increased to 320 p.s.i.g. After four hours the reactor was cooled to room temperature and opened in a dry box. The product was a semi-solid material mixed with decaborane. The product was soluble in benzene and dichloroethane and was insoluble in n-pentane. The n-pentane removed the decaborane and the product lost its semi-solid properties and became a friable powder. The powder was thermoplastic.

*Examples 2–7*

The experiments of these examples were carried out in the same general manner as that of Example 1.

The reactants, reaction conditions and product descriptions relating to these experiments are contained in the following Table I.

TABLE I.—REACTION OF 1,3-BUTADIENE WITH DECABORANE

| Expt. No. | Butadiene, moles | Decaborane, moles | n-Pentane, moles | Methyl ether, moles | Other Ingredients | Temp., °C. | Time, hr. | Boron Content, Percent | Type Material |
|---|---|---|---|---|---|---|---|---|---|
| 1 | .075 | .075 | | .2 | | 165 | 4¼ | 56.6 | Dry powder. |
| 2 [a] | .075 | .075 | | .2 | Iodine | 115 | 2 | 28.7 | Sticky substance. |
| 3 | .075 | .075 | | .2 | | 175 | 1 | 54.2 | Putty like material. |
| 4 | .075 | .075 | | .2 | | 130 | 7½ | | Do. |
| 5 | .075 | .075 | | .2 | | 60 | 8 | No reaction | |
| 6 | .075 | .075 | .2 | .05 | | 165 | 1½ | 63 | Thick viscous liquid. |
| 7 [b] | .075 | .075 | .2 | .05 | Copper powder, 4.2 g. | 165 | 7 | 61.1 | Do. |

[a] The product appeared as though an incomplete reaction took place.
[b] Infrared analysis of the product indicated mostly an alkylated decaborane with very little unreacted decaborane present.

The same reaction conditions were repeated in Example 2 except that several crystals of iodine were added as a butadiene polymerization inhibitor and the maximum temperature reached was 115° C. While the product had thermoplastic properties and contained a significant percentage of boron, the conditions for the reaction were too mild for a complete reaction.

In Examples 3 and 4 conditions varying slightly from Example 1 were used with the resultant products being in the form of putty-like materials which were soluble in benzene and dichloroethane and insoluble in n-pentane.

In Example 5 a much less severe temperature was employed. Although the example was continued for eight hours, no evidence of a reaction could be observed.

In Example 6 the quantity of di-methyl ether was reduced from 0.2 mole to 0.05 mole and 0.2 mole of n- pentane was added as a diluent in order to moderate the reaction. The temperature was increased to 165° C. in an hour and a half and a maximum pressure of 340 p.s.i.g. was obtained. After removal of the vapors, the remaining product consisted of benzene soluble and benzene insoluble materials. The benzene insoluble material contained no boron and appeared to be polybutadiene. The soluble portion, after benzene removal and decaborane sublimation, was a dark brown viscous liquid. Analysis indicated an alkylated decaborane.

Example 7 is similar to Example 6 except that a butadiene polymerization inhibitor, i.e. hydrogen reduced copper, was added. When the reactor was opened and the contents removed, the product was similar to that of Example 6 having both benzene soluble and benzene insoluble components. The viscous liquid contained 61.1 percent boron which is theoretical for a 1:1 addition product of butadiene with decaborane. Infrared analysis indicated that this product was an alkylated decaborane with little unreacted decaborane present.

The exact role of the lower dialkyl ether in the reaction of a conjugated diolefin with decaborane is obscure. It is interesting to note, however, that decaborane and a lower dialkyl ether alone react violently after a short induction period and that a conjugated diolefin and a lower dialkyl ether do not react even when maintained at high temperatures for several hours. Moreover, it is known that decaborane polymerizes butadiene. It appears that the lower dialkyl ether in an undetermined way causes the decaborane to react with the conjugated diolefin.

The boron containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the muanfacture of a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per squrae inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures, and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

While in Examples 6 and 7 n-pentane was used as a solvent, other hydrocarbon solvents suitable for employment in the method of this invention include aliphatic hydrocarbon solvents such as hexane and heptane, aromatic hydrocarbon solvents such as benzene, toluene and xylene and cycloaliphatic solvents such as cyclohexane and methylcyclopentane.

We claim:
1. A method for the preparation of reaction products of decaborane and a conjugated diolefin which comprises reacting 0.5 to 10 moles of decaborane per mole of a conjugated diolefin hydrocarbon containing from 4 to 5 carbon atoms at a temperature within the range from about 100° C. to about 200° C. while the reactants are in admixture with a catalytic amount of a lower dialkyl ether.

2. A method for the preparation of reaction products of decaborane and a conjugated diolefin which comprises reacting 0.5 to 10 moles of decaborane per mole of a conjugated diolefin hydrocarbon containing from 4 to 5 carbon atoms and a temperature within the range from about 100° C. to 200° C. while the reactants are in admixture with a hydrocarbon solvent and a catalytic amount of a lower dialkyl ether.

3. A method for the preparation of reaction products of decaborane and a conjugated diolefin which comprises reacting 0.5 to 10 moles of decaborane per mole of conjugated diolefin hydrocarbon containing from 4 to 5 carbon atoms at a temperature within the range from about 100° C. to about 200° C. while the reactants are in admixture with a catalytic amount of a lower dialkyl ether and one of the materials selected from the group consisting of iodine and copper powder.

4. A method for the preparation of reaction products of decaborane and a conjugated diolefin which comprises reacting 0.5 to 10 moles of decaborane per mole of a conjugated diolefin hydrocarbon containing from 4 to 5 carbon atoms at a temperature within the range from about 100° C. to about 200° C. while the reactants are in admixture with a hydrocarbon solvent, copper powder, and a catalytic amount of a lower dialkyl ether.

5. The method of claim 1 in which the conjugated diolefin is 1,3-butadiene.

6. The method of claim 1 in which the lower dialkyl ether is dimethyl ether.

7. The method of claim 1 in which the conjugated diolefin is 1,3-butadiene and the lower dialkyl ether is dimethyl ether.

8. The method of claim 2 in which the conjugated diolefin is 1,3-butadiene.

9. The method of claim 2 in which the lower dialkyl ether is dimethyl ether.

10. The method of claim 2 in which the conjugated diolefin is 1,3-butadiene and the lower dialkyl ether is dimethyl ether.

11. The product produced by the method of claim 1.
12. The product produced by the method of claim 2.
13. The product produced by the method of claim 4.

References Cited by the Examiner

UNITED STATES PATENTS

| | | |
|---|---|---|
| 1,950,438 | 3/1934 | Carothers. |
| 2,386,272 | 10/1945 | Schulze _____ 260—666.5 X |
| 3,084,181 | 4/1963 | D'Alelio _____ 260—606.5 |
| 3,103,537 | 9/1963 | Rutkowski _____ 260—606.5 |
| 3,129,251 | 4/1964 | Rutkowski _____ 260—606.5 |

HELEN M. McCARTHY, *Acting Primary Examiner.*

LEON D. ROSDOL, CARL D. QUARFORTH, TOBIAS E. LEVOW, *Examiners.*

L. A. SEBASTIAN, F. R. OWENS, W. F. BELLAMY,
*Assistant Examiners.*